(12) United States Patent
Zhang

(10) Patent No.: US 10,825,131 B2
(45) Date of Patent: Nov. 3, 2020

(54) CIRCULAR FISHEYE CAMERA ARRAY RECTIFICATION

(71) Applicant: Intel Corporation, Santa Clara, CA (US)

(72) Inventor: Fan Zhang, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 16/189,814

(22) Filed: Nov. 13, 2018

(65) Prior Publication Data

US 2019/0080430 A1    Mar. 14, 2019

(51) Int. Cl.
| G06T 3/00 | (2006.01) |
| H04N 5/232 | (2006.01) |
| G06T 5/00 | (2006.01) |
| G06T 5/50 | (2006.01) |

(52) U.S. Cl.
CPC ............ G06T 3/0018 (2013.01); G06T 5/001 (2013.01); G06T 5/006 (2013.01); G06T 5/50 (2013.01); H04N 5/23238 (2013.01); *G06T 2207/10012* (2013.01)

(58) Field of Classification Search
CPC ......... G06T 3/0018; G06T 5/006; G06T 5/50; G06T 5/001; G06T 2207/10012; H04N 5/23238

See application file for complete search history.

(56) References Cited

U.S. PATENT DOCUMENTS

| 2014/0267596 | A1* | 9/2014 | Geerds | H04N 5/2252 348/38 |
| 2016/0360104 | A1* | 12/2016 | Zhang | H04N 13/239 |
| 2018/0253875 | A1* | 9/2018 | Gorur Sheshagiri | G06T 3/0081 |
| 2018/0278916 | A1* | 9/2018 | Kim | G06T 7/596 |
| 2018/0357804 | A1* | 12/2018 | Forutanpour | G06T 11/60 |
| 2019/0014260 | A1* | 1/2019 | Mu | H04N 5/23238 |
| 2019/0082103 | A1* | 3/2019 | Banerjee | H04N 13/00 |
| 2019/0108622 | A1* | 4/2019 | Douady-Pleven | G06T 5/002 |
| 2019/0281319 | A1* | 9/2019 | Galpin | H04N 19/182 |
| 2020/0020075 | A1* | 1/2020 | Khwaja | G06T 5/002 |
| 2020/0084394 | A1* | 3/2020 | Adsumilli | H04N 19/167 |

OTHER PUBLICATIONS

Fusiello, A. et al., "A Compact Algorithm for Rectification of Stereo Pairs", Machine Vision and Applications; vol. 12.1; pp. 16-22; 2000.

(Continued)

*Primary Examiner* — Nhan T Tran
(74) *Attorney, Agent, or Firm* — Green, Howard & Mughal LLP.

(57) ABSTRACT

Techniques related to image rectification for fisheye images are discussed. Such techniques may include iteratively determining warpings for equirectangular images corresponding to the fisheye images using alternating feature mappings between neighboring ones of the equirectangular images until mean vertical disparities between the features are reduced below a threshold, and warping the equirectangular images to rectified equirectangular images.

21 Claims, 7 Drawing Sheets

(56) References Cited

OTHER PUBLICATIONS

Heckbert, P. "Fundamentals of Texture Mapping and Image Warping", Master's Thesis; Dept. of Electrical Engineering and Computer Science; University of California, Berkeley, CA, USA; 1989.
Igarashi, T. et al., "As-Rigid-As-Possible Shape Manipulation", ACM transactions on Graphics (TOG) 24.3 (2005): 1134-1141.
Kang, Y.-S. et al., "An Efficient Image Rectification Method for Parallel Multi-Camera Arrangement", IEEE transactions on Consumer Electronics 57.3; 2011.
Richardt, C. et al., "Megastereo: Constructing High-Resolution Stereo Panoramas", IEEE Conference on Computer Vision and Pattern Recognition (CVPR), 2013. IEEE, 2013.
Scaramuzza, D. et al., "A Toolbox for Easily Calibrating Omnidirectional Cameras", International Conference on Intelligent Robots and Systems, 2006 IEEE/RSJ IEEE, 2006.

\* cited by examiner

CIRCULAR FISHEYE CAMERA ARRAY RECTIFICATION

BACKGROUND

In some contexts, omnidirectional light field content may be captured using a circular camera array equipped with cameras having ultra-wide field of view fisheye lenses (e.g., 220 degree fisheye lenses). To generate high quality light field content in such contexts, calibration and rectification of the images from the circular camera array is needed.

Current techniques rectify stereo images from planar camera arrays based on epipolar geometry by applying a rectification transformation for each camera such that the optical axes of all the cameras are parallel with each other and the epipoles of all images are located at infinity. As a result, corresponding pixels among all rectified images can be horizontally or vertically aligned. However, such techniques can only handle planar camera arrays and are not suitable for circular camera arrays of ultra-wide field of view fisheye lenses.

Therefore, current techniques are inadequate for performing high quality and/or efficient calibration and rectification of images from a circular camera array of ultra-wide field of view fisheye lenses. It is with respect to these and other considerations that the present improvements have been needed. Such improvements may become critical as the desire to generate omnidirectional light field content for use in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
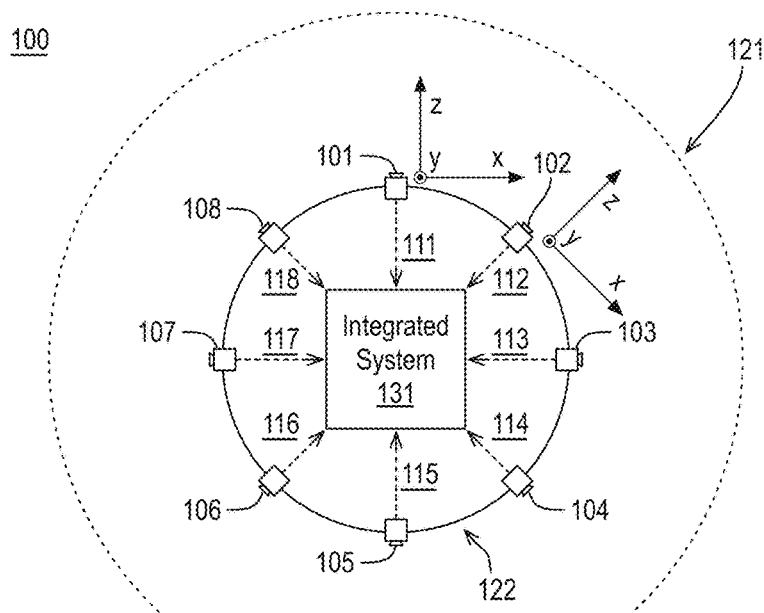
FIG. 1 illustrates an example circular camera array for attaining neighboring fisheye images of a scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to rectification of images corresponding to fisheye images of a scene and, in particular, to iteratively moving feature points between alternating pairs of images for improved rectification with reduced image distortion.

As described above, in some contexts, omnidirectional light field content may be captured using a circular camera array equipped with ultra-wide field of view fisheye lenses (e.g., 220 degree fisheye lenses). To generate high quality light field content in such contexts, calibration and rectification of the images from the circular camera array is needed. As used herein, the term rectification indicates the process of projecting images onto a common image plane. Such processing may be an important initial step in a variety of applications such as light field applications, virtual reality applications, etc. The image-based circular fisheye camera array rectification techniques discussed herein effectively rectify the captured fisheye images, preserve depth information, and eliminate or reduce vertical disparities. The discussed techniques may improve light field content quality to ultimately deliver comfortable light field viewing experiences for an end user.

In some embodiments, image rectification may include attaining feature point correspondences between equirectangular images that correspond to neighboring fisheye images of a scene. As used herein the term fisheye image indicates an image captured or generated based on a fisheye view of a scene (e.g., using or corresponding to a fisheye lens having a field of view of not less than 180 degrees). A fisheye image may also be characterized as a spherical image. The fisheye image may be in any suitable format or projection format. The term equirectangular image indicates a projection from the fisheye image onto an equirectangular image plane and the equirectangular image may also be in any suitable format. The feature point correspondences between the equirectangular images each include a feature point mapping between feature points of a neighboring pair of the equirectangular images. That is, each feature point correspondence includes a feature point mapping (e.g., indicating feature points between images are of the same feature) between first and second images such that each image has two mappings: one mapping feature points to an image neighboring the image in a first direction and another mapping feature points to an image neighboring the image in a second direction opposite the first direction.

Based on the feature point correspondences, multiple iterations of image warpings are determined until an end condition is met such that each iteration includes determining a warping of an image based on the first of the feature point mappings (e.g., using a neighboring image in one direction) and determining a warping of the image based on the second of the feature point mappings (e.g., using a neighboring image in the other direction). As used herein, the term determining a warping of an image indicates that a warping function or mapping is determined, although the warping function or mapping may not be applied to the entire image. For example, a warping function may be used only to determine updated or current feature point locations while the remainder of the image is not warped using the determined warping function. For example, the warping function may indicate new vertex locations of a mesh grid applied over the image while the warping function is not applied to the image. Determining the warping functions for each of the equirectangular images using alternating neighbors (e.g., left and right neighbors) provides for reduced error propagation in determining the warpings and reduces artifacts relative to, for example, using one image as a reference and warping consecutive neighboring images in a particular direction.

After an end condition is met (e.g., a measure of vertical difference between all feature point correspondences comparing favorably to a threshold), the image warpings corresponding to the end condition are used to warp each of the equirectangular images to generate rectified equirectangular images. Notably, the actual image warping is performed using the final vertex positions for each of the equirectangular images after the discussed iterative processing has converged to the end condition. The rectified equirectangular images may then be transmitted for presentment. As used herein the term transmit (or provide or send, etc.) for presentment indicates preparing or storing the image for later presentment or sending the image to a display or display buffer for immediate presentment, such transmission for presentment may include transmitting an image to a display device, storing an image to memory for later presentment, transferring an image to another device for presentment, etc.

FIG. 1 illustrates an example circular camera array 100 for attaining neighboring fisheye images of a scene, arranged in accordance with at least some implementations of the present disclosure. As shown in FIG. 1, circular camera array 100 may include any number of fisheye cameras 101, 102, 103, 104, 105, 106, 107, 108 for attaining corresponding synchronous fisheye images 111, 112, 113, 114, 115, 116, 117, 118 (or video) of a scene 121. Notably, circular camera array 100 may attain a full view of scene 121 to ultimately provide an immersive view of scene 121 to a user. As used herein, the term synchronous is used to indicate that images or video are synchronized substantially in time.

As shown, to capture 360 degree content of scene 121, fisheye cameras 101-108 in circular camera array 100 each point in a direction perpendicular to a camera circle 122 of circular camera array 100 as illustrated with respect to the z-direction (shown with respect to fisheye cameras 101, 102). Each of fisheye cameras 101-108 are substantially aligned vertically (e.g., in the y-direction) along the plane of camera circle 122 such that the y-axis of each of fisheye cameras 101-108 is substantially perpendicular to the plane of camera circle 122. Furthermore, each of fisheye cameras 101-108 have a horizontal dimension (e.g., in the x-direction) that substantially is along a tangent of camera circle 122. Due to the alignment of fisheye cameras 101-108 in circular camera array 100 with respect to camera circle 122, keystone effects and artifacts are introduced into the captured fisheye images 111-118. Notably, corresponding points between any two neighboring fisheye cameras 101-108, without rectification, will have vertical disparities, which is a key factor for visual fatigue in, for example, virtual reality applications.

Circular camera array 100 may include any suitable number of fisheye cameras such that an associated number of fisheye images may be attained. In various embodiments, circular camera array 100 includes 8 fisheye cameras 101-108, 10 fisheye cameras, 12 fisheye cameras, or more. Furthermore, in the illustrated embodiment, circular camera array 100 includes fisheye cameras evenly spaced camera circle 122; however, circular camera array 100 may include any suitable arrangement and spacing fisheye cameras 101-108. For example, fisheye cameras 101-108 may not be evenly spaced around camera circle 122. Although illustrated with respect to circular camera array 100, fisheye images 111-118 may be attained or generated using any suitable system such as an image rendering engine.

Each of fisheye cameras 101-108 neighbors two other fisheye cameras of fisheye cameras 101-108 such that one neighbor is in a first direction and a second neighbor is in a second direction opposite the first direction. As shown, fisheye camera 101 is neighbored by fisheye cameras 102, 108, fisheye camera 102 is neighbored by fisheye cameras 101, 103, fisheye camera 103 is neighbored by fisheye cameras 102, 104, and so on. Such neighbor directions may be described as left and right neighbors. Correspondingly, each of fisheye images 111-118 neighbors two other fisheye images of fisheye images 111-118 such that one neighbor is in a first direction and a second neighbor is in a second direction opposite the first direction. As shown, fisheye image 111 is neighbored by fisheye images 112, 118, fisheye image 112 is neighbored by fisheye images 111, 113, fisheye image 113 is neighbored by fisheye images 112, 114, and so on. As used herein, the terms neighbor and neighboring indicate an adjacent camera or image such that no other intervening cameras or images are between two neighboring cameras or images.

As shown, fisheye images 111-118 are provided to integrated system 131 for processing as discussed herein. Integrated system 131 may include any suitable components for processing fisheye images 111-118 to generate rectified equirectangular images. For example, integrated system 131 may include one or more central processors, image processors, memory stores, etc. to effectuate the image processing operations discussed herein. Integrated system 131 may be implemented integral to fisheye cameras 101-108 (e.g., via the same frame and/or housing) or integrated system 131 may be implemented separate from fisheye cameras 101-108 or any other source of fisheye images 111-118 (or equirectangular images received for rectification).

As discussed further herein, provided circular camera array 100 have camera poses that are properly corrected (e.g., the y axis of all cameras are substantially perpendicular to the principle plane of camera circle 122 and the z axis of all cameras are substantially perpendicular to camera circle 122), feature correspondences are estimated between every two neighboring images (e.g., between every two neighboring equirectangular images corresponding to fisheye images 111-118), a warping function is estimated for each equirectangular image that is capable of transforming the equirectangular image to a target location so that all pairwise horizontal disparities (e.g., in the x direction) are substantially preserved and vertical disparities (e.g., in the y direction) between each image pair are substantially eliminated, and the estimated warping functions are applied to the equirectangular images to rectify each image. As discussed further herein, such warping functions are estimated using an iterative alternating pair-wise approach. The discussed techniques effectively rectify circular camera array images to eliminate vertical disparities and preserve depth information between neighboring images to provide rectified equirectangular images that can be input into a variety of applications to improve the quality of generated virtual reality content to deliver a comfortable VR viewing experience to end users.

Although discussed herein with respect to processing equirectangular images, any suitable image formats corresponding to fisheye images may be implemented and used for display, pre-processing, or other image processing steps. In particular, the discussed techniques are compatible with any image format (e.g., they are not limited to equirectangular images) and for use in any display device, such as VR display devices, such that vertical disparities are eliminated in equirectangular images. Notably, for equirectangular images, the most precise way to rectify images may include maintaining corresponding content from two images at the same epipolar curve. In the discussed techniques, the epipolar curve may be approximated as a straight line since the valid field of view in most display applications (e.g., head mounted displays) is about 70 degrees, such that only a small portion in the middle of an image (e.g., a 180×360 portion of an equirectangular image) will be presented to a viewer at each head location. Furthermore, the region of interest for the viewer (e.g., the portion of the displayed portion that is being intently viewed) at each head location is smaller still. Therefore, the epipolar curve, as discussed, can be approximated as a straight line and substantially or fully eliminating all vertical disparities in the equirectangular images provides suitable results in terms of quality while the discussed techniques provide reduced runtime and complexity as well as compatibility with any suitable image format.

Figure 2:
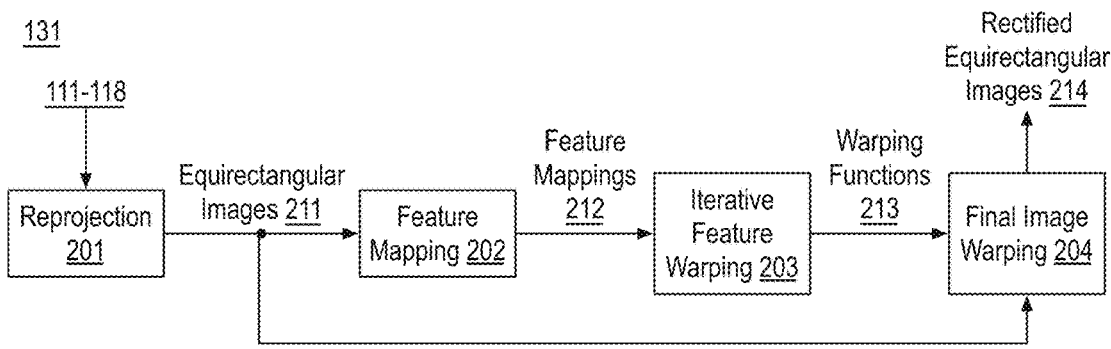
FIG. 2 illustrates an example integrated system for providing image rectification for images corresponding to fisheye images of a scene.

FIG. 2 illustrates an example integrated system 131 for providing image rectification for images corresponding to fisheye images of a scene, arranged in accordance with at least some implementations of the present disclosure. As shown in FIG. 2, integrated system 131 includes a reprojection module 201, a feature mapping module 202, an iterative feature warping module 203, and a final image warping module 204. Integrated system 131 may be implemented in any suitable form factor device such as a personal computer, a laptop computer, a tablet, a phablet, a smart phone, a digital camera, a gaming console, a wearable device, a display device, a virtual reality headset, etc. For example, integrated system 131 may perform image rectification as discussed herein. In some embodiments, in addition or in the alternative to fisheye cameras 101-108, integrated system 131 may attain fisheye images 111-118 from memory, another device, a rendering engine, etc.

As shown, integrated system 131 generates, receives or otherwise attains fisheye images 111-118, which may include any number of fisheye images. Fisheye images 111-118 may be in any suitable format and may each include an image representative of a same scene at a same time. Reprojection module 201 receives fisheye images 111-118 and reprojects each of fisheye images 111-118 from a fisheye image plane to an equirectangular image plane to generate equirectangular images 211 (e.g., unrectified equirectangular images). As will be appreciated, equirectangular images 211 includes the same number of images (e.g., 8) as fisheye images 111-118. As discussed with respect to fisheye images 111-118, each of equirectangular images 211 has two neighboring images thereto (e.g., one in each of opposing directions). Reprojection module 201 may reproject each of fisheye images 111-118 using any suitable technique or techniques to generate equirectangular images 211.

Figure 3:
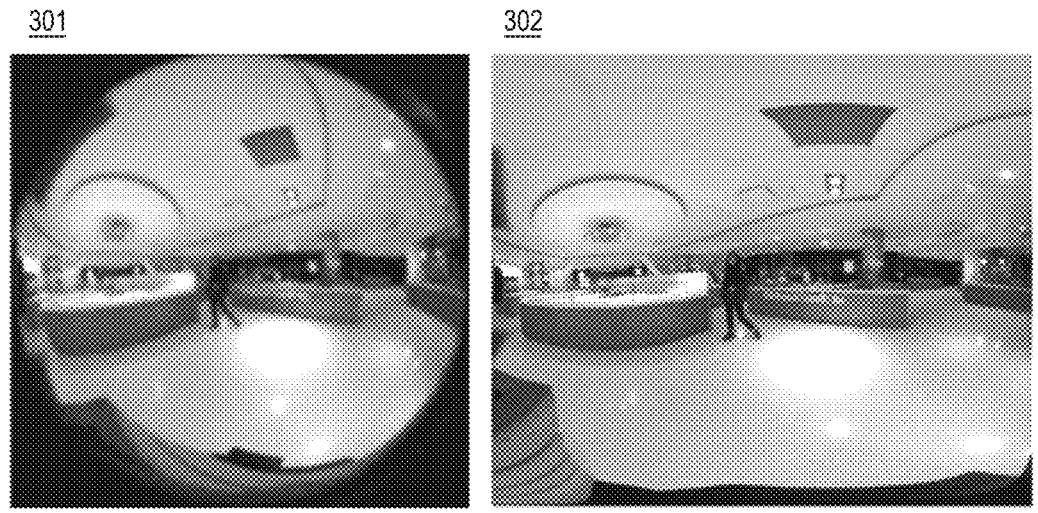
FIG. 3 illustrates an example fisheye image and an example equirectangular image.

FIG. 3 illustrates an example fisheye image 301 and an example equirectangular image 302, respectively, arranged in accordance with at least some implementations of the present disclosure. As shown, fisheye image 301 contains image content on a fisheye image plane, which may be reprojected onto an equirectangular image plane to generate equirectangular image 302.

Returning to FIG. 2, feature mapping module 202 receives equirectangular images 211. Feature mapping module 202 determines or estimates feature correspondences between each neighboring image pair of equirectangular images 211 and provides such feature correspondences as feature mappings 212. As used herein, the terms feature correspondences and feature mappings are used interchangeably and indicate data structures, markings, indications, or the like that indicate feature points between two images corresponding to the same feature. For example, a feature point in a first image and a feature point in a second image are indicated as corresponding if they are deemed to be feature points of the same feature. Such feature correspondences may be determined using any suitable technique or techniques such as scale-invariant feature transform (SIFT) feature detection techniques. For example, given three neighboring images I1, I2 and I3, each image will have two sets of feature correspondences matching with its right neighbor and left neighbor, respectively. Assuming I1 is a left neighbor of I2 and I3 is a right neighbor of I2, using I2 as an example, it has two feature correspondence sets: feature correspondence set f2_3 which contains feature correspondences between I2 and I3 and feature correspondence set f2_1 which contains feature correspondences between I2 and I1. Such feature correspondences are discussed further with respect to FIG. 5 and elsewhere herein.

As shown, iterative feature warping module 203 receives feature mappings 212 (as well as the locations of such features within equirectangular images 211 and equirectangular images 211 themselves, as needed) and iterative feature warping module 203 generates warping functions 213 such that warping functions 213 include a warping function for each of equirectangular images 211. The iterative feature warping performed by iterative feature warping module 203 is discussed further herein below. Warping functions 213 correspond to an end condition of such iterative feature warping (e.g., warping functions 213 are final warping functions for equirectangular images 211).

Final image warping module 204 receives warping functions 213 and equirectangular images 211 and final image warping module 204 applies each warping function of warping functions 213 to the corresponding equirectangular image of equirectangular images 211 to generate rectified equirectangular images 214. Each of warping functions 213 may include any data structure, function, or the like to warp equirectangular images 211 to rectified equirectangular images 214. For example, each of warping functions 213 may include indications of changes in locations of vertices of a mesh applied over each of equirectangular images 211. Each of equirectangular images 211 may then be warped using the warped mesh to generate rectified equirectangular images 214. Rectified equirectangular images 214 may be stored to memory and/or transmitted for display or further processing. For example, rectified equirectangular images 214 may be used in virtual reality applications, light field virtual reality applications, stereoscopic virtual reality applications, etc.

Figure 4:
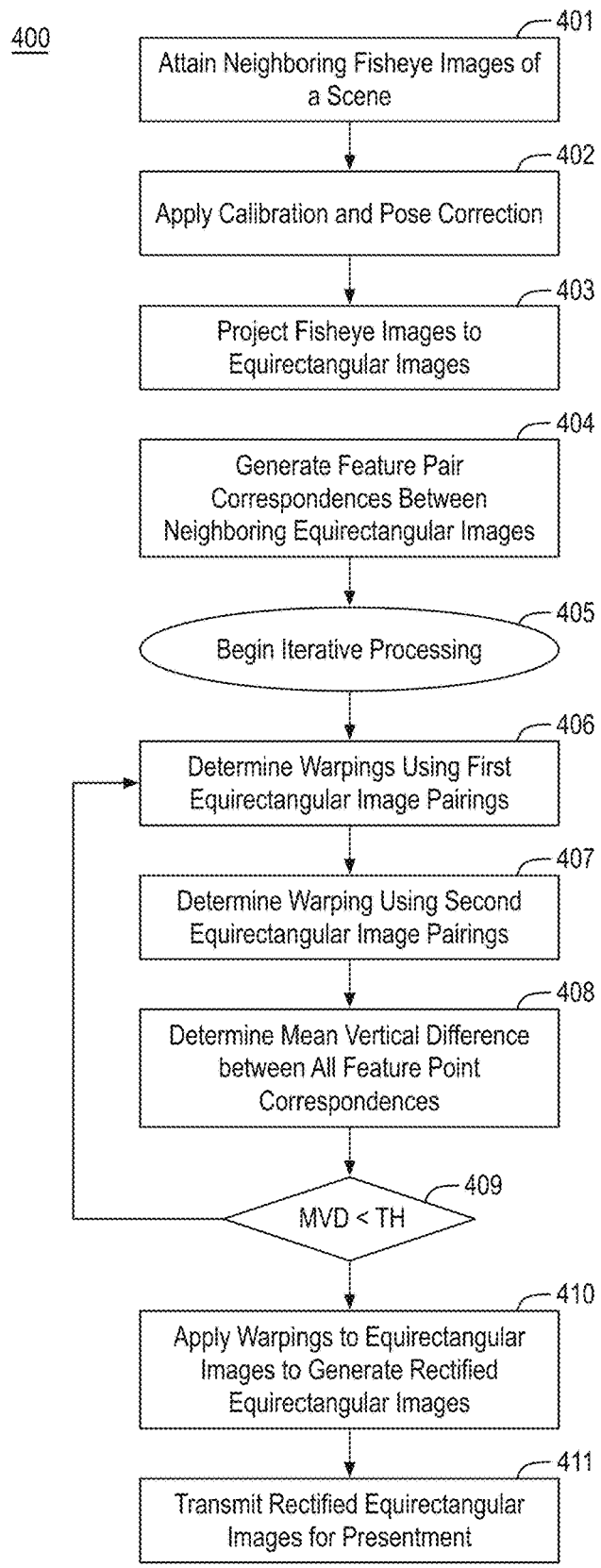
FIG. 4 illustrates an example process for providing image rectification for images corresponding to fisheye images of a scene.

FIG. 4 illustrates an example process 400 for providing image rectification for images corresponding to fisheye images of a scene, arranged in accordance with at least some implementations of the present disclosure. Process 400 may include one or more operations 401-411 as illustrated in FIG. 4. Process 400 or portions thereof may be performed by a device or integrated system (e.g., or integrated system 131 or any other device or system discussed herein) to perform image rectification. Process 400 or portions thereof may be repeated for any number sets of images.

Process 400 begins at operation 401, where a set of neighboring fisheye images of a scene are attained. The set of neighboring fisheye images may include any number of fisheye images of any suitable scene. Furthermore, the set of neighboring fisheye images may be attained using any suitable technique or techniques such as image capture via circular camera array 100, fetching from memory, transmission from another device, etc. As discussed, the set of neighboring fisheye images are neighboring in that each image of the set has two neighbors, one in a first direction from the image and another in a second direction opposite the first direction from the image.

Processing continues at operation 402, where optional calibration and pose correction may be applied to the set of neighboring fisheye images. For example, calibration may be performed before and/or after the image capture of the set of neighboring fisheye images and such calibration may include, in pre-capture contexts, capturing images with checkerboard patterns and aligning such patterns in hardware and/or software. Calibration may include attaining intrinsic and/or extrinsic camera parameters and implementing them before and/or after image capture of the set of neighboring fisheye images. Furthermore, pose correction may correct camera poses in the array of cameras such that the y axis of each camera is perpendicular to the camera circle (please refer to FIG. 1). Such pose correction techniques may also be implemented in hardware and/or software before and/or after image capture of the set of neighboring fisheye images. Processing continues at operation 403, where each fisheye image of the set of neighboring fisheye images is reprojected from the fisheye image plane to an equirectangular image plane to generate a set of equirectangular images 211. The fisheye may be reprojected from the fisheye image plane to the equirectangular image plane using any suitable technique or techniques.

To rectify the equirectangular images corresponding to the discussed fisheye images and substantially eliminate vertical disparities, the following operations use pure image-based warping techniques. Notably, a set of rectified equirectangular images corresponding to fisheye images is considered properly rectified if corresponding feature points among all rectified images are in substantially the same horizontal line (e.g., the vertical disparities are substantially eliminated) and the original depth information is properly preserved (e.g., to ultimately deliver a 3D feel to an end user).

Processing continues at operation 404, where feature correspondences between each neighboring image pair of the set of equirectangular images are generated. Such feature correspondences may be determined using any suitable technique or techniques such as scale-invariant feature transform (SIFT) feature detection techniques. As discussed, feature correspondences are determined between each neighboring pair of equirectangular images. For example, at operation 404, feature point correspondences are determined multiple equirectangular images such that each of the equirectangular images corresponds to one of multiple neighboring fisheye images of a scene. The feature point correspondences each include a feature point mapping between feature points of a neighboring pair of the equirectangular images.

Figure 5:
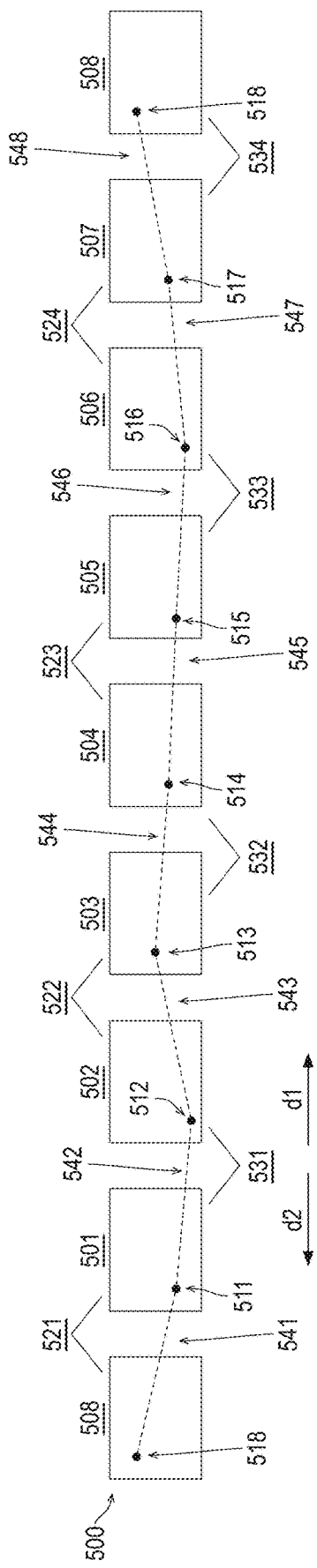
FIG. 5 illustrates example feature correspondences between each neighboring pair of equirectangular images.

FIG. 5 illustrates example feature correspondences between each neighboring pair of equirectangular images, arranged in accordance with at least some implementations of the present disclosure. As shown in FIG. 5, a set of neighboring equirectangular images 500 may include equirectangular images 501, 502, 503, 504, 505, 506, 507, 508 such that each equirectangular image of equirectangular images 501-508 has a left neighbor and a right neighbor. For example, equirectangular image 503 is neighbored to the left by equirectangular image 502 and to the right by equirectangular image 504, equirectangular image 504 is neighbored to the left by equirectangular image 503 and to the right by equirectangular image 505, equirectangular image 501 is neighbored to the left by equirectangular image 508 and to the right by equirectangular image 502, and so on. It is noted that in FIG. 5 equirectangular image 508 is illustrated twice (to the right of equirectangular image 507 and to the left of equirectangular image 501) for the sake of clarity of presentation.

Furthermore, each of equirectangular images 501-508 has any number of features including feature points 511, 512, 513, 514, 515, 516, 517, 518 thereof that have been detected and deemed to correspond to a feature of a neighboring equirectangular image as shown via feature point correspondences 541, 542, 543, 544, 545, 546, 547, 548. Such feature detection and correspondence determination may be made using any suitable technique or techniques. In the illustration, a single feature point 511-518 is shown with respect to each of equirectangular images 501-508 for the sake of clarity. However, each of equirectangular images 501-508 may have any number of features. Notably, a feature may be in only a subset of equirectangular images 501-508 (e.g., it may not be visible in all images). Furthermore, one or more features in any of equirectangular images 501-508 may find a correspondence in one neighboring image, but not in the other neighboring image.

Returning to FIG. 4, processing continues at operation 405, where iterative processing begins. Such iterative processing includes determining warpings of equirectangular images using alternating pairings of such equirectangular images. A first set of pairings is established such that each of equirectangular images is in a pair. For each equirectangular image in a pair, target feature point locations are determined using the corresponding feature points from the paired equirectangular image. For example, for a paired image I1 and I2, for I1 target feature point positions are determined for the feature points that have correspondences in image I2 as the horizontal position of the feature point unchanged and a vertical position of the feature point that is halfway to the vertical position of the corresponding feature point in I2. Target feature point positions are likewise determined for the feature points in image I2. Such target feature point positions generated only using feature correspondences within the pair are used to generate an image warping for I1 and another image warping for I2 that uses the target feature point positions, the original feature point positions, and other image information to limit distortion as is discussed further herein.

Then, a second set of pairings is established such that each of equirectangular images is in a different pair. That is, no pairing in the first set is repeated in the second set. The discussed target feature point locations and warpings are then repeated, this time using the different pairings. Furthermore, the feature points are moved relative to the movement already completed at previous iterations. The target feature point locations and warpings are then repeated with the first set of pairings (using the updated feature point locations), and then the second, and so on in an alternating fashion until an end condition is met (e.g., a target or maximum number of iterations is reached, a measure of vertical difference between all feature point correspondences meets a threshold, etc.).

For example, as discussed further below, for equirectangular images I1, I2, I3, I4, I5, I6, I7, I8 in a neighboring order, at a first iteration, equirectangular image pairs (I1,I2), (I3,I4), (I5,I6), (I7,I8) are warped toward their vertical middle positions (e.g., using target feature positions at vertical middle positions). Then at the second iteration, equirectangular image pairs (I2,I3), (I4,I5), (I6,I7), (I8,I1) are warped toward their vertical middle positions (e.g., again using target feature positions at vertical middle positions). That is, multiple iterations of image warpings are determined for the equirectangular images using the feature point correspondences until an end condition is met such that the multiple iterations each includes determining a first image warping for a first equirectangular image (e.g., equirectangular image 502) using a first feature point correspondence between the first equirectangular image and a second equirectangular image (e.g., equirectangular image 503) that neighbors the first equirectangular image in a first direction (e.g., d1) and determining a second image warping for the first equirectangular image (e.g., equirectangular image 502) using a second feature correspondence between the first equirectangular image and a third equirectangular image that neighbors the first equirectangular image (e.g., equirectangular image 501) in a second direction (e.g., d2).

As shown, such iterative processing begins at operation 406, where a first set of pairings is established and warpings for each of the equirectangular images are determined using only intra-pairing information using the first set of pairings (e.g., target feature point locations are generated using only the intra-pairing correspondences). Such warpings may be determined using any suitable technique or techniques such as those discussed herein with respect to Equations (1) through (4).

With reference to FIG. 5, first equirectangular image pairings 531, 532, 533, 534 may be established such that equirectangular image pairing 531 pairs equirectangular images 501, 502, equirectangular image pairing 532 pairs equirectangular images 503, 504, equirectangular image pairing 533 pairs equirectangular images 505, 506, and equirectangular image pairing 534 pairs equirectangular images 507, 508. For sake of convenience and arbitrarily, such first equirectangular image pairings 531, 532, 533, 534 may be labeled as first pairings, even pairings, right side pairings, etc.

Using such first equirectangular image pairings 531, 532, 533, 534, target feature point positions are determined for each feature point in each of equirectangular images 501-508. In an embodiment, the target feature point for each feature point has a location that is unmoved horizontally and moved to a position equidistant between the feature point and the corresponding feature point of the paired image as is discussed further herein with respect to FIG. 7.

Using such feature point targets, the original feature points, and other information, a warping for each of equirectangular images 501-508 is determined. Notably, each warping uses feature point targets determined using only the other equirectangular image in the pair. For example, feature point targets for equirectangular image 501 are determined only using the current feature point positions thereof and the feature point positions of the corresponding feature points of equirectangular image 502. Similarly, feature point targets for equirectangular image 502 are determined only using the current feature point positions thereof and the feature point positions of the corresponding feature points of equirectangular image 501. Notably, for corresponding feature points, the vertical target positions within equirectangular images 501, 502 will be the same while their horizontal target positions will not necessarily be the same (they are unchanged as discussed).

Such target feature point determinations are made for each of equirectangular images 501-508 in a similar manner such that only intra-pair feature point pairings are used: feature point targets for equirectangular image 503 are determined only using the current feature point positions thereof and the feature point positions of the corresponding feature points of equirectangular image 504, feature point targets for equirectangular image 504 are determined only using the current feature point positions thereof and the feature point positions of the corresponding feature points of equirectangular image 503, feature point targets for equirectangular image 505 are determined only using the current feature point positions thereof and the feature point positions of the corresponding feature points of equirectangular image 506, feature point targets for equirectangular image 506 are determined only using the current feature point positions thereof and the feature point positions of the corresponding feature points of equirectangular image 505, and so on.

After determination of the warping for each of equirectangular images 501-508, such warpings are applied to modify the locations of the feature points 511-518 thereof, but not to warp the equirectangular images 501-508 themselves. Such warping of equirectangular images 501-508 is only applied after final warpings are determined to reduce artifacts in the resultant images. Such updated feature point locations are then used at subsequent processing operations an iterations.

Figure 6:
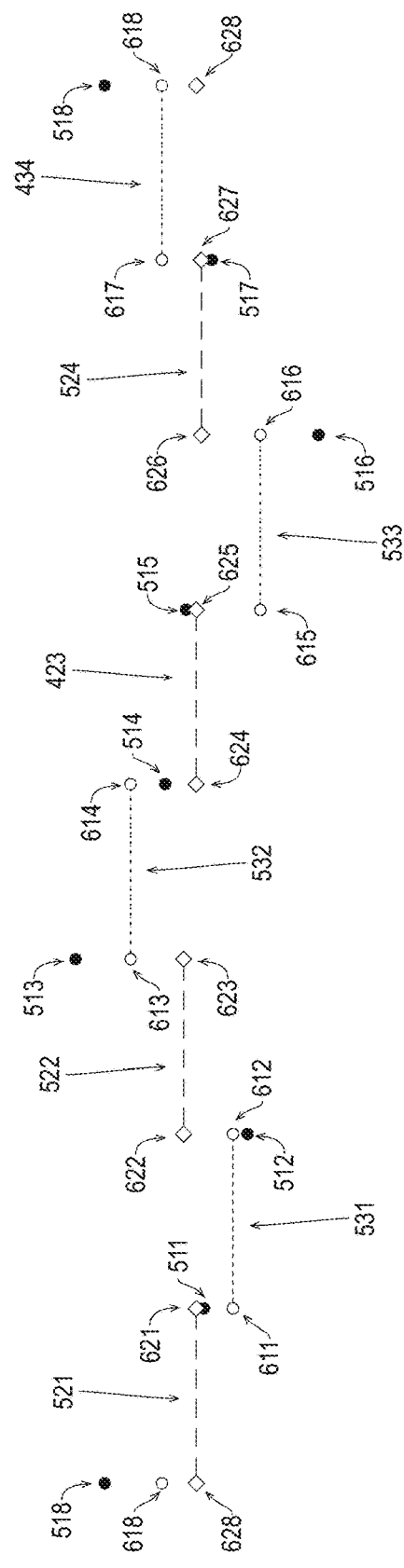
FIG. 6 illustrates example feature point warping for equirectangular images.

FIG. 6 illustrates example feature point warping for equirectangular images, arranged in accordance with at least some implementations of the present disclosure. As shown in FIG. 6, feature points 511-518 (having positions illustrated using filled dots), based on warpings determined using equirectangular image pairings 531, 532, 533, 534 are moved to feature point locations 611, 612, 613, 614, 615, 616, 617, 618 (having positions illustrated using unfilled dots). As shown, feature points 511-518 have initial positions with substantial vertical disparities among them. At the discussed first iteration, using warpings based on equirectangular image pairings 531, 532, 533, 534, feature points 511-518 are warped to feature point locations 611-618 (e.g., using feature point target positions at the vertical middle position of each corresponding feature pair) to substantially reduce (or, in some cases eliminate) the vertical disparities between feature points 611-618 in equirectangular image pairings 531, 532, 533, 534.

Returning to FIG. 4, such alternative iterative processing continues at operation 407, where a second set of pairings is established and warpings for each of the equirectangular images are determined using only intra-pairing information using the second set of pairings (e.g., target feature point locations are generated using only the intra-pairing correspondences). Such warpings may be determined using any suitable technique or techniques such as those discussed herein with respect to Equations (1) through (4). The same techniques may be used at operations 406, 407, or they may be different.

With reference to FIG. 5, second equirectangular image pairings 521, 522, 523, 524 may be established such that equirectangular image pairing 521 pairs equirectangular images 508, 501, equirectangular image pairing 522 pairs equirectangular images 502, 503, equirectangular image pairing 523 pairs equirectangular images 504, 505, and equirectangular image pairing 524 pairs equirectangular images 506, 507. Such second equirectangular image pairings 521, 522, 523, 524 may be labeled as second pairings, odd pairings, left side pairings, etc. in contrast to first equirectangular image pairings 531, 532, 533, 534.

With reference to equirectangular image 503, in first equirectangular image pairing 532, equirectangular image 503 is paired with equirectangular image 504, an image along a first direction, d1, with respect to equirectangular image 503. In second equirectangular image pairing 522, equirectangular image 503 is paired with equirectangular image 502, an image along a second direction, d2, with respect to equirectangular image 503 that is opposite direction d1. Each of equirectangular images 501-508 has a similar relationship with its paired equirectangular image in first equirectangular image pairings 531, 532, 533, 534 and second equirectangular image pairings 521, 522, 523, 524.

Using such second equirectangular image pairings 521, 522, 523, 524, target feature point positions are determined for each feature point in each of equirectangular images 501-508 in analogy to those target feature point positions discussed with respect to equirectangular image pairings 531, 532, 533, 534 with the exception being updated feature point positions (from the first iteration) are used instead of original feature point positions. In an embodiment, the target feature point for each feature point has a location that is unmoved horizontally and moved to a position equidistant between the (updated) feature point and the corresponding (updated) feature point of the paired image.

Based on such feature point targets, the updated feature point positions, and other information, a warping for each of equirectangular images 501-508 is determined using the new pairings. Notably, each warping uses feature point targets determined using only the other equirectangular image in the pair established by second equirectangular image pairings 521, 522, 523, 524. For example, feature point targets for equirectangular image 501 are determined only using the updated feature point positions thereof and the feature point positions of the corresponding feature points of equirectangular image 508. Similarly, feature point targets for equirectangular image 508 are determined only using the updated feature point positions thereof and the feature point positions of the corresponding feature points of equirectangular image 501.

Such target feature point determinations are made for each of equirectangular images 501-508 in a similar manner such that only intra-pair feature point pairings are used: feature point targets for equirectangular image 503 are determined only using the current feature point positions thereof and the feature point positions of the corresponding feature points of equirectangular image 502, feature point targets for equirectangular image 502 are determined only using the current feature point positions thereof and the feature point positions of the corresponding feature points of equirectangular image 503, feature point targets for equirectangular image 505 are determined only using the current feature point positions thereof and the feature point positions of the corresponding feature points of equirectangular image 504, feature point targets for equirectangular image 505 are determined only using the current feature point positions thereof and the feature point positions of the corresponding feature points of equirectangular image 505, and so on. Notably, each pairing in first equirectangular image pairings 531, 532, 533, 534 is excluded from second equirectangular image pairings 521, 522, 523, 524.

As discussed above, after determination of the warping for each of equirectangular images 501-508, such warpings are applied to modify the locations of the feature points 511-518 thereof, but not to warp the equirectangular images 501-508 themselves.

Turning now to FIG. 6, feature points 611-618, based on warpings determined using second equirectangular image pairings 521, 522, 523, 524 are moved to feature point locations 621, 622, 623, 624, 625, 626, 627, 628 (having positions illustrated using unfilled diamonds). As shown, feature points 611-618 have updated positions with substantially reduced vertical disparities among them. At the discussed second iteration, using warpings based on equirectangular image pairings 521, 522, 523, 524, feature points 611-618 are warped to feature point locations 621-628 (e.g., using feature point target positions at the vertical middle position of each corresponding feature pair) to again substantially reduce (or, in some cases eliminate) the vertical disparities between feature points 621-628.

Returning to FIG. 4, such iterative processing continues at operation 408 and decision operation 409, where an end condition is determined and evaluated to determine whether processing is to continue. If so, processing continues as discussed until the end condition is met. In an embodiment, the end condition is a mean vertical difference or disparity (MVD) among all feature point correspondences comparing favorably to a threshold (TH) such that the mean vertical difference is less than the threshold, for example. For example, with reference to FIG. 6, a mean vertical disparity among all feature point correspondences may measure a mean of the difference in vertical positions between feature point locations 621 and 618, feature point locations 622 and 621, feature point locations 623 and 612, and so on. Although illustrated with a mean vertical difference using all feature point correspondences, in some embodiments, outlier vertical differences (e.g., those above another threshold) may be discarded. Furthermore, other additional or alternative end conditions such as variance of the vertical differences also needing to be below a separate threshold, a minimum or maximum number of iterations requirement, etc. may be used. It is noted that operation 408 is illustrated as being performed after both operations 406 and 407 are performed. However, in some embodiments, operation 408 is performed after each of operations 406, 407.

As shown in FIG. 4, when the end condition has been met, processing continues at operation 410, where the final warpings for each of the equirectangular images are applied thereto to generate rectified equirectangular images having features that are substantially aligned vertically while substantially maintaining horizontal positions. As discussed, since repeatedly warping the equirectangular images (e.g., at each iteration) could introduce interpolation artifacts, at the iteration operations 406, 407, only the coordinates of the feature points are warped using the determined warpings for the equirectangular images without warping the actual equirectangular images. After the final optimized target positions are determined for all feature points, the target positions and initial positions of all feature points are used to determine a warping function to simulate the sequential warping functions through the iteration processing.

Processing continues at operation 411, where rectified equirectangular images are provided for presentment to a viewer. The rectified equirectangular images may be provided for presentment to a viewer or user by, for example, transmitting one or more of the rectified equirectangular images to a display device, storing the rectified equirectangular images to memory for later presentment, or transferring rectified equirectangular images to another device for presentment.

As discussed, between equirectangular image pairings, feature point target positions are determined for use in determining warpings for each of the equirectangular images. In an embodiment, target feature point positions are determined for the feature points of each of the equirectangular image pair such that the horizontal position of a feature point is unchanged with respect to the feature point and the vertical position of the feature point is halfway to the vertical position of the corresponding feature point in the other equirectangular image. In an embodiment, a feature point target position is in a position of no change in a first dimension (e.g., a horizontal dimension) and a position between a first current feature point of a first equirectangular image and a corresponding first current feature point of the second equirectangular image in a second dimension (e.g., a vertical dimension). For example, the first and second dimensions may be substantially orthogonal to one another.

Figure 7:
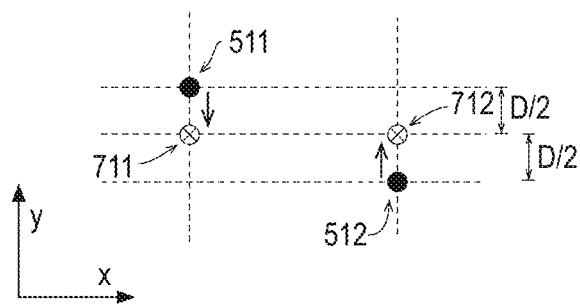
FIG. 7 illustrates exemplary feature point target positions for corresponding feature points.

FIG. 7 illustrates exemplary feature point target positions for corresponding feature points, arranged in accordance with at least some implementations of the present disclosure. In FIG. 7, corresponding feature points 511, 512 are illustrated. For example, when equirectangular image pairing 531 is used, corresponding feature points 511, 512 are used to determine a target feature point position 711 for feature point 511 and a target feature point position 712 for feature point 512. As shown, in an embodiment, target feature point position 711 has a position that has no change in the horizontal direction (e.g., along the x axis) and a position that is equidistant, in the vertical direction (e.g., along the y axis), between the vertical position of feature point 511 and feature point 512 such that, as shown, target feature point position 711 is D/2 in the vertical direction from feature point 511 (e.g., in the negative y direction) and D/2 in the vertical direction from corresponding feature point 512 (e.g., in the positive y direction) such that feature point 511 and feature point 512 are separated by a distance, D, in the vertical direction).

Similarly, target feature point position 712 has a position that has no change in the horizontal direction (e.g., along the x axis) and a position that is equidistant, in the vertical direction (e.g., along they axis), between the vertical position of feature point 511 and feature point 512 such that, as shown, target feature point position 712 is D/2 in the vertical direction from feature point 512 (e.g., in the positive y direction) and D/2 in the vertical direction from corresponding feature point 511 (e.g., in the negative y direction) such that feature point 511 and feature point 512 are separated by a distance, D, in the vertical direction). Notably, target feature point positions 711, 712 have the same vertical coordinates but may have differing horizontal coordinates.

Such target feature point positions 711, 712 may be generated for each feature point of each of equirectangular images 501-508 at each iteration, assuming the feature point has a corresponding feature point in its paired image. If not, no target feature point may be generated. For example, a feature point of an equirectangular image may have a corresponding feature point in a first pairing but no corresponding feature point in a second pairing. As discussed, each image has two sets of feature correspondences with respect to its left neighboring equirectangular image and right neighboring equirectangular image. For example, for a particular equirectangular image, the discussed techniques reduce the vertical disparities with respect to a first neighboring equirectangular image in odd iterations and reduce vertical disparities with respect to a second neighboring equirectangular image (in an opposite direction) in even iterations. To keep the vertical disparity elimination process consistent in each iteration, the same set of feature correspondences are used. After each iteration, the positions of both sets of feature correspondences are kept track of for each image and updated over the iterative processing. Discussion now turns to determining warpings for each of equirectangular images 501-508 at each iteration (e.g., both even and odd) using the described target feature points positions 711, 712.

Figure 8:
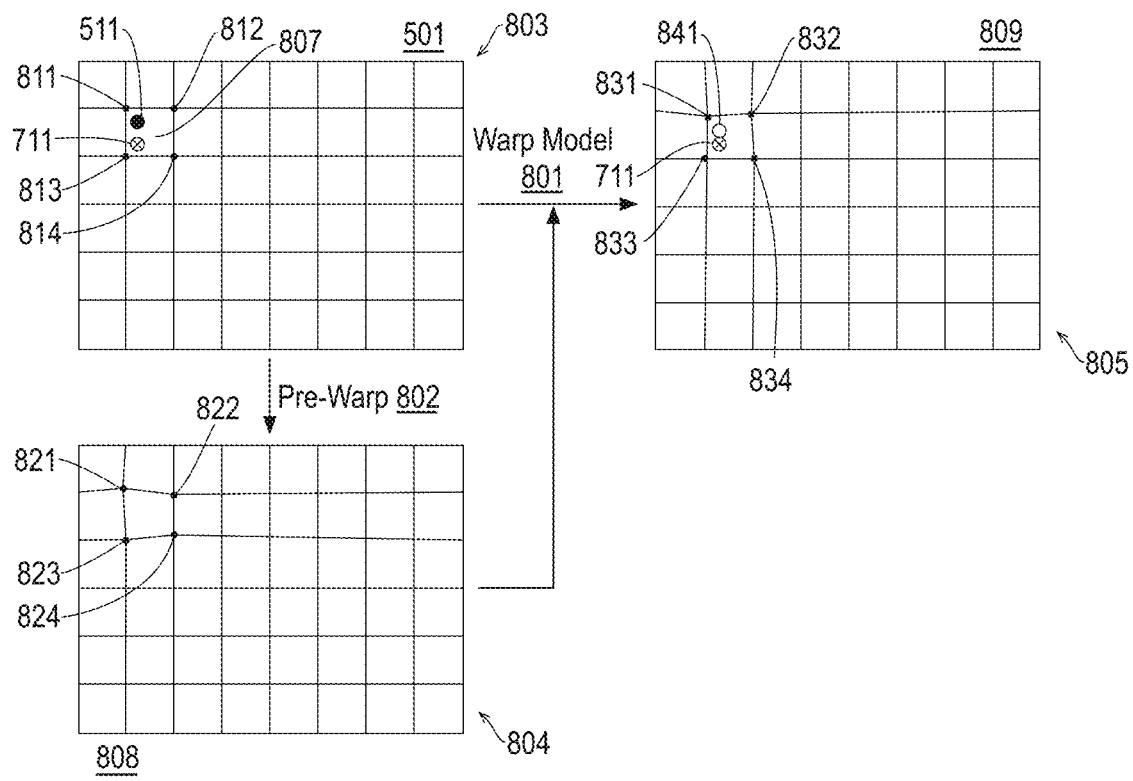
FIG. 8 illustrates an example determination of a warping or warping function for an equirectangular image.

FIG. 8 illustrates an example determination of a warping or warping function for equirectangular image 501, arranged in accordance with at least some implementations of the present disclosure. As discussed, a warping is determined for each of equirectangular images 501-508 at each iteration. Such warpings are used to determine updated feature point locations for each of equirectangular images 501-508, although the warpings are not used to warp the actual equirectangular images 501-508. Only, a final warping result is used to warp the actual equirectangular images 501-508.

As shown, for equirectangular image 501, feature point 511 is located at some position therein. Also illustrated with respect to equirectangular image 501, is target feature point position 711 corresponding to feature point 511, which may be determined using a corresponding feature point of a paired equirectangular image as discussed with respect to FIG. 7. Only a single feature point 511 and a single target feature point position 711 are illustrated for the sake of clarity. However, equirectangular image 501 may include any number of feature points and target feature point positions.

As discussed below, a content-preserving warp model 801 is generated such that the warp model provides a warping of the feature points 511 of equirectangular image 501 toward target positions 711. Target positions 711 are determined using matched corresponding feature points in neighboring equirectangular image in an alternating manner in even and odd iterations as discussed. Furthermore, the positions of feature points 511 are modified, tracked, and used as the inputs for each next iteration. Notably, the discussed warping techniques are applied for each of equirectangular images 501-508 at each iterative operations (e.g., as discussed with respect to operations 406, 407). As shown in FIG. 8, in an embodiment, equirectangular image 501 is divided by a grid mesh 803 and warp model 801 is determined as a mesh warping problem such that the unknowns are the coordinates of mesh vertices in resultant grid mesh 805. As shown, grid mesh 803 includes vertices such as vertices 811, 812, 813, 814 at intersections of lines of the mesh. Warp model 801 provides a model that warps grid mesh 803 to grid mesh 805 such that vertices 831, 832, 833, 834 of grid mesh 805 are modified or moved with respect to vertices 811, 812, 813, 814 of grid mesh 803. In an embodiment, the mesh warping problem is defined as a quadratic minimization problem that enforces vertical disparities between the feature correspondences toward zero and minimizes visual distortion. Notably, the warping from grid mesh 803 to grid mesh 805 is then used to modify the locations of feature points 511 to warped feature point positions 841, which are then used as input to next iterations.

For example, $p_i$ may represent feature points 511 in equirectangular image 501 (e.g., an input image), $\hat{p}_I$ may represent target positions 711 (e.g., the target position for $p_i$ to eliminate the vertical disparity between the corresponding feature point and its neighboring image at the current iteration). Since each feature point $p_i$ in equirectangular image 501 is not necessarily on a grid vertex of grid mesh 803, the grid cell that encloses each feature point $p_i$ is determined and the feature point $p_i$ is represented as a linear combination of the four vertices $\{v_i\}$ of the enclosing cell. For example, representative feature point 511 is within grid cell 807 and the location of feature point 511 in equirectangular image 501 may be represented as a linear combination of the locations of vertices 811, 812, 813, 814. Any number and size of grid cells (e.g., 30×30 pixels) may be used with smaller grid cells improving accuracy at the cost of greater computational time. The linear coefficients to combine the locations of vertices 811, 812, 813, 814 to determine the location of feature point 511 may be determined using any suitable technique or techniques such as inverse bilinear interpolation techniques. The linear coefficients of feature point 511, which may be represented as $w_{i,k}$ may then be combined with the (unknown) vertices $\hat{v}_j$ in a resultant warped image 809 to determine the location of feature point 511 in resultant warped image 809. That is, the linear coefficients used to locate feature point 511 with respect to vertices 811, 812, 813, 814 are also used to locate the feature point (ultimately a warped feature point position 841) with respect to vertices 831, 832, 833, 834 (which are the unknowns of warp model 801).

As discussed below with respect to Equation (4) below, multiple energy terms may be used to generate a mesh warping function including combining (e.g., via weighted summing) the multiple energy terms such that the solution of the mesh warping function are those vertices of grid mesh 805 that minimize the mesh warping function. For example, the warping function may include a cost minimization function to move the current feature points of the first equirectangular image toward the feature point target positions based on local differences between the current feature points and the feature point target positions and global distortion of the first equirectangular image, and optionally a grid mesh similarity term. For example, the mesh warping function may include a sum of a local alignment term (e.g., a local alignment energy term), a global alignment term (e.g., a global alignment or global distortion energy term), and a grid mesh similarity term (e.g., a grid mesh similarity energy term) all defined with vertices of grid mesh 805 as unknowns such that the solution provides vertices of grid mesh 805 including vertices 831, 832, 833, 834. Warp model 801, which provides translation of the vertices of grid mesh 803 to the vertices of grid mesh 805 may be used to determine warped feature point positions 841 and, when a final warp model has been determined, a rectified equirectangular image.

In an embodiment, a local alignment term is defined as shown in Equation (1):

$$E_d = \sum_{i=1}^{n} \left\| \sum w_{i,k} \tilde{v}_{i,k} - \hat{p}_i \right\|^2 \qquad (1)$$

where $E_d$ is the local alignment term, $w_{i,k}$ are linear coefficients of each feature point within a grid cell, $\widetilde{v_{i,k}}$ are the unknown vertex locations of grid mesh 805, and $\hat{p}_I$ are target positions 711 of feature points 511. As shown, the local alignment energy includes a difference between the locations of the feature points determined using positions of grid mesh 805 vertices and feature point target positions 711. In an embodiment, the local alignment energy term includes a sum of squares of differences between the locations of each feature point determined using positions of grid mesh 805 vertices and each feature point target position 711. As will be appreciated, the local alignment term may be minimized when the locations of each feature point determined using positions of grid mesh 805 vertices and each feature point target position 711 match.

In an embodiment, a global alignment term is defined as shown in Equation (2):

$$E_g = \sum_i \tau_i \|\hat{v}_i - \tilde{v}_i\|^2 \qquad (2)$$

where $E_g$ is the global alignment term, $\hat{v}_l$ are the unknown vertex locations of grid mesh 805, $\tilde{v}_l$ are vertex locations of a grid mesh generated based on a pre-warping of equirectangular image 501 using homography techniques, and $\tau_l$ is a binary value such that it is one when no feature point is within a neighborhood of the vertex locations and a value of zero when a feature point within a neighborhood of the vertex locations.

For example, locally warping an image (as by the local alignment term of Equation (1) often causes distortion for regions that have fewer (or no) feature points. To alleviate such image distortion problems, equirectangular image 501 is pre-warped 802 using a pre-estimate homography technique to generate a pre-warped image 808 having a grid mesh 804 including vertex positions such as vertices 821, 822, 823, 824 (e.g., vertex locations $\tilde{v}_l$) and the vertices of grid mesh 805 are encouraged to match the pre-warped result in those areas without feature points. Such a pre-warping may be performed using any suitable technique or techniques such as homography techniques to generate positions of a mesh of vertices of grid mesh 804). As shown, the global alignment term includes a difference between positions of grid mesh 805 vertices and positions of grid mesh 804 vertices (e.g., vertices of a grid mesh based on a warping of equirectangular image 501 using homography). In an embodiment, the global alignment energy term includes a sum of squares of differences between positions of grid mesh 805 vertices and positions of grid mesh 804 vertices modified based on binary value $\tau_l$. As discussed, the binary value may provide for the global alignment term to be zero for those positions of the mesh of vertices within a neighborhood of any feature point of the feature points. In an embodiment, when feature point 511 is within grid cell 807, the binary value is zero for vertices 821, 822, 823, 824 and vertices 831, 832, 833, 834. In an embodiment, the neighborhood may be extended such that, when feature point 511 is within grid cell 807, the binary value is zero for all vertices of grid cell 807 and those of grid cells above and to the left, above, above and to the right, to the left, to the right, below and to the left, below, and below and to the right of grid cell 807 (e.g., the 8 neighbors of grid cell 807). As will be appreciated, the global alignment term may be minimized when the locations of the vertices of grid mesh 805 match the locations of the vertices of grid mesh 804.

In an embodiment, a grid mesh similarity term is defined as shown in Equation (3):

$$E_s = \sum_{\hat{v}_i} \alpha_i \| \hat{v}_i - (\hat{v}_j + u(\widehat{v_k} - \hat{v}_j) + vR(\widehat{v_k} - \hat{v}_j)) \|^2 \tag{3}$$

where $E_s$ is the grid mesh similarity term, $\hat{v}_i$, $\hat{v}_j$, $\widehat{v_k}$ are vertices of a grid cell in the output mesh, $\alpha_i$ is a saliency term inside the cell defined by the vertices, u and v are the coordinates of $v_i$ in the local coordinate system defined by $v_j$ and $v_k$ with $$R = \begin{bmatrix} 0 & 1 \\ -1 & 0 \end{bmatrix}.$$

For example, to further minimize image distortion, each grid cell may be encouraged to undergo a similarity transformation. For example, the grid mesh similarity term reduces grid warping based on the vertices of grid mesh 805.

As discussed, the discussed energy terms (e.g., a local alignment energy term, a global alignment or global distortion energy term, and a grid mesh similarity term) may be summed to provide a mesh warping function or the like as shown in Equation (4) such that the solution may provide a warping, a mesh warping, or warp model 801 as discussed herein:

$$E = E_d + \lambda E_g + \gamma E_s \tag{4}$$

where E is the function (e.g., energy summation) to be minimized, $E_d$ is a local alignment energy term, $E_g$ is a global alignment or global distortion energy term, $E_s$ is a grid mesh similarity term, and $\lambda$ and $\gamma$ are weights with values in the range of 0.7 and 0.01. As shown, in an embodiment, the energy summation includes a sum of a local alignment energy term, a global alignment or global distortion energy term, and a grid mesh similarity term. In an embodiment, the energy summation includes a sum of the local alignment energy term and the global alignment or global distortion energy term, and the grid mesh similarity term is not used.

The energy minimization problem provided by Equation (4) may be solved using any suitable technique or techniques to generate vertex positions of grid mesh 805, $\hat{v}_l$. In an embodiment, the energy minimization problem is solved using a sparse linear solver. As discussed with respect to process 400, at each iteration, the vertex positions of grid mesh 805 are used to generate feature point positions (e.g., warped feature point positions) for a next iteration until an end condition is met. After the end condition has been met, the vertex positions of grid mesh 805 are used to warp each input equirectangular image to generate a rectified equirectangular image.

The discussed iterative processing may be performed any number of times until the end condition is met. Such rectification techniques provide for rectified images with most or all vertical disparities removed. In some embodiments, the discussed mean vertical disparities among all feature correspondences are reduced across iterations such that, for example, after about 100-120 iterations, the mean vertical disparity is less than 1 pixel. Furthermore, in some implementations, inaccurate feature correspondences between equirectangular images or for textureless regions of equirectangular images without any feature correspondence, may be resolved by manually correcting and/or adding feature point correspondences between equirectangular images. For example, at operation 404, manual intervention to correct and/or add feature point correspondences between equirectangular images may be implemented.

Figure 9:
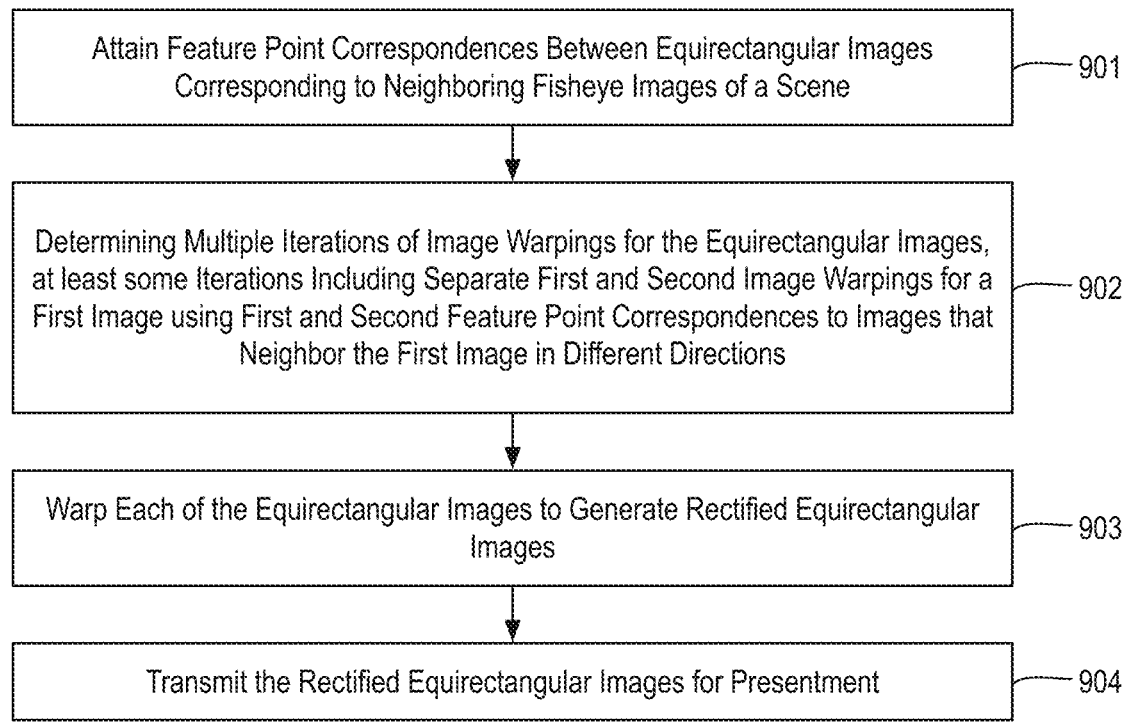
FIG. 9 is a flow diagram illustrating an example process for providing image rectification.

FIG. 9 is a flow diagram illustrating an example process 900 for providing image rectification, arranged in accordance with at least some implementations of the present disclosure. Process 900 may include one or more operations 901-904 as illustrated in FIG. 9. Process 900 may form at least part of an image rectification technique for images corresponding to fisheye images. By way of non-limiting example, process 900 may form at least part of a rectification technique performed by integrated system 131 as discussed herein. Furthermore, process 900 will be described herein with reference to system 1000 of FIG. 10.

Figure 10:
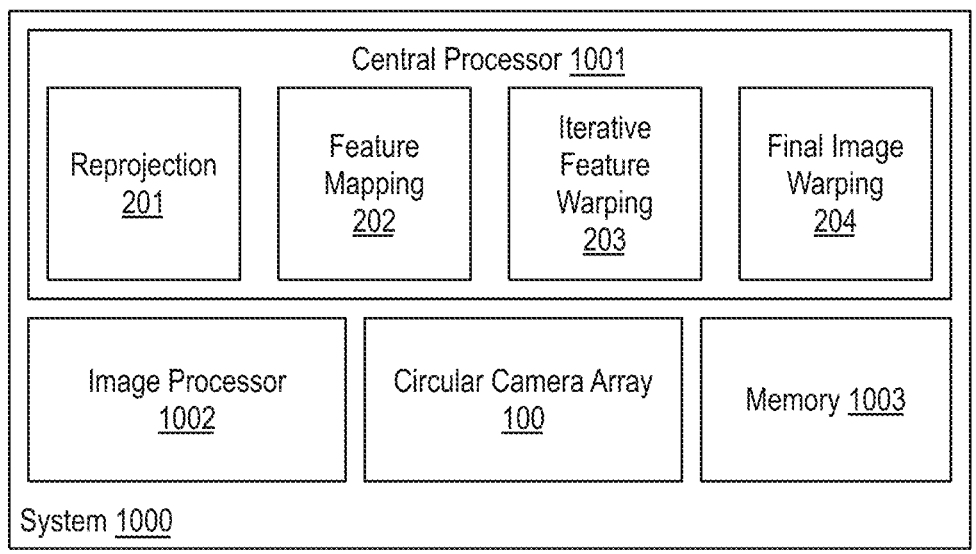
FIG. 10 is an illustrative diagram of an example system for providing image rectification.

FIG. 10 is an illustrative diagram of an example system 1000 for providing image rectification, arranged in accordance with at least some implementations of the present disclosure. As shown in FIG. 10, system 1000 may include a central processor 1001, an image processor 1002, a memory 1003, and circular camera array 100. Also as shown, central processor 1001 may include or implement reprojection module 201, feature mapping module 202, iterative feature warping module 203, and final image warping module 204.

Such components or modules may be implemented to perform operations as discussed herein. For example, reprojection module 201 may generate equirectangular images from fisheye images, feature mapping module 202 may generate feature mappings, iterative feature warping module 203 may generate final image warpings, and final image warping module 204 may apply the final image warpings to the equirectangular images to generate rectified equirectangular images. Memory 1003 may store fisheye images, equirectangular images, feature correspondences, mapping functions, rectified equirectangular images, or any other data discussed herein.

As shown, in some examples, reprojection module 201, feature mapping module 202, iterative feature warping module 203, and final image warping module 204 are implemented via central processor 1001. In other examples, one or more or portions of reprojection module 201, feature mapping module 202, iterative feature warping module 203, and final image warping module 204 are implemented via image processor 1001, a video processor, a graphics processor, or the like. In yet other examples, one or more or portions of reprojection module 201, feature mapping module 202, iterative feature warping module 203, and final image warping module 204 are implemented via an image or video processing pipeline or unit.

Image processor 1002 may include any number and type of graphics, image, or video processing units that may provide the operations as discussed herein. In some examples, image processor 1002 may be an image signal processor. Such operations may be implemented via software or hardware or a combination thereof. For example, image processor 1002 may include circuitry dedicated to manipulate image data or video data obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory.

In an embodiment, one or more or portions of reprojection module 201, feature mapping module 202, iterative feature warping module 203, and final image warping module 204 are implemented via an execution unit (EU) of image processor 1002. The EU may include, for example, programmable logic or circuitry such as a logic core or cores that may provide a wide array of programmable logic functions. In an embodiment, one or more or portions of reprojection module 201, feature mapping module 202, iterative feature warping module 203, and final image warping module 204 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of reprojection module 201, feature mapping module 202, iterative feature warping module 203, and final image warping module 204 are implemented via an application specific integrated circuit (ASIC). The ASIC may include an integrated circuitry customized to perform the operations discussed herein.

Circular camera array 100 may include any suitable camera array having fisheye lenses as discussed herein. In other embodiments, circular camera array 100 may not be implemented via system 1000.

Returning to discussion of FIG. 9, process 900 begins at operation 901, where feature point correspondences between multiple equirectangular images are attained such that each of the equirectangular images corresponds to one of a plurality of neighboring fisheye images of a scene. The feature point correspondences may include any suitable data structure such that the feature point correspondences each include a feature point mapping between feature points of a neighboring pair of the equirectangular images. In an embodiment, the fisheye images are attained using cameras having fields of view of not less than 180 degrees. In an embodiment, the equirectangular images are generated by reprojecting the fisheye images to an equirectangular. In an embodiment, the feature point correspondences are generated using SIFT feature detection techniques.

Processing continues at operation 902, where multiple iterations of image warpings are determined for the equirectangular images based on the feature point correspondences until an end condition is met such that at least some of the iterations each include determining a first image warping for a first equirectangular image based on a first feature point correspondence between the first equirectangular image and a second equirectangular image that neighbors the first equirectangular image in a first direction and determining a second image warping for the first equirectangular image based on a second feature correspondence between the first equirectangular image and a third equirectangular image that neighbors the first equirectangular image in a second direction.

In an embodiment, the iterations each include determining third image warpings for each of the equirectangular images based on first pairings of neighboring ones of the equirectangular images such that the third image warpings comprise the first image warping and determining fourth image warpings for each of the equirectangular images based on second pairings of neighboring ones of the equirectangular images such that the each pairing in the first pairings is excluded from the second pairings and the fourth image warpings comprise the second image warping. In an embodiment, the iterations each include determining a measure of vertical difference between all feature point correspondences and setting the end condition as met when the measure of vertical difference compares favorably to a threshold.

In an embodiment, determining the first image warping includes generating feature point target positions for current feature points of the first equirectangular image in the first feature point correspondence such that a first feature point target position of the feature point target positions has a position of no change in a first dimension and a position between a first current feature point of the first equirectangular image and a corresponding first current feature point of the second equirectangular image in a second dimension and estimating a warping function for the first equirectangular image based on the current feature points and the feature point target positions to determine the first image warping. In an embodiment, the first dimension is a horizontal dimension of the first equirectangular image, the second dimension is a vertical dimension of the first equirectangular image, and the position between the first current feature point of the first equirectangular image and the corresponding first current feature point of the second equirectangular image in the vertical dimension is substantially equidistant between the first current feature point of the first equirectangular image and the corresponding first current feature point of the second equirectangular image in the vertical dimension.

In an embodiment, the warping function is a cost minimization function to move the current feature points of the first equirectangular image toward the feature point target positions based on local differences between the current feature points and the feature point target positions and global distortion of the first equirectangular image. In an embodiment, the warping function includes a mesh warping function to move a mesh of vertices applied to the first equirectangular image from first to second positions such that determining the second positions includes determining locations of the feature points using the first positions of the mesh of vertices, generating the warping function with the second positions of the mesh of vertices as unknowns based on at least the locations of the feature points using the first positions of the mesh of vertices and the feature point target positions, and determining the second positions of the mesh of vertices using the warping function.

In an embodiment, the warping function includes a sum of a local alignment term and a global alignment term such that the local alignment term includes a difference between the locations of the feature points using the first positions of the mesh of vertices and the feature point target positions, the global alignment term includes a difference between the second positions of the mesh of vertices and third positions of the mesh vertices based on a warping of the first equirectangular image using homography, and determining the second positions of the mesh of vertices using the warping function comprises minimizing the warping function. In an embodiment, the global alignment term is zero for those second positions of the mesh of vertices within a neighborhood of any feature point of the feature points. In an embodiment, the warping function further includes a grid mesh similarity term to reduce grid warping based on the second positions of the mesh of vertices.

Processing continues at operation 903, where each of the equirectangular images are warped using image warpings corresponding to the end condition to generate rectified equirectangular images. The equirectangular images may be warped using any suitable technique or techniques such as mesh warping techniques. In an embodiment, a mesh warping corresponding to the end condition is generated for each of the equirectangular images and the mesh warpings are applied to the equirectangular images to generate the rectified equirectangular images.

Processing continues at operation 904, where the rectified equirectangular images are transmitted for presentment. The rectified equirectangular images may be transmitted for presentment by transmitting one or more of the rectified equirectangular images to a display device for presentment, transmitting one or more of the rectified equirectangular images to a memory for later presentment, or transferring one or more of the rectified equirectangular images to another device for presentment.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multifunction device or a computing system such as, for example, a laptop computer, a tablet, or a smart phone. Those skilled in the art may recognize that systems described herein may include additional components that have not been depicted in the corresponding figures. For example, the systems discussed herein may include additional components such as image pre-processing circuitry, memory controllers, or the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement any operation discussed herein or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
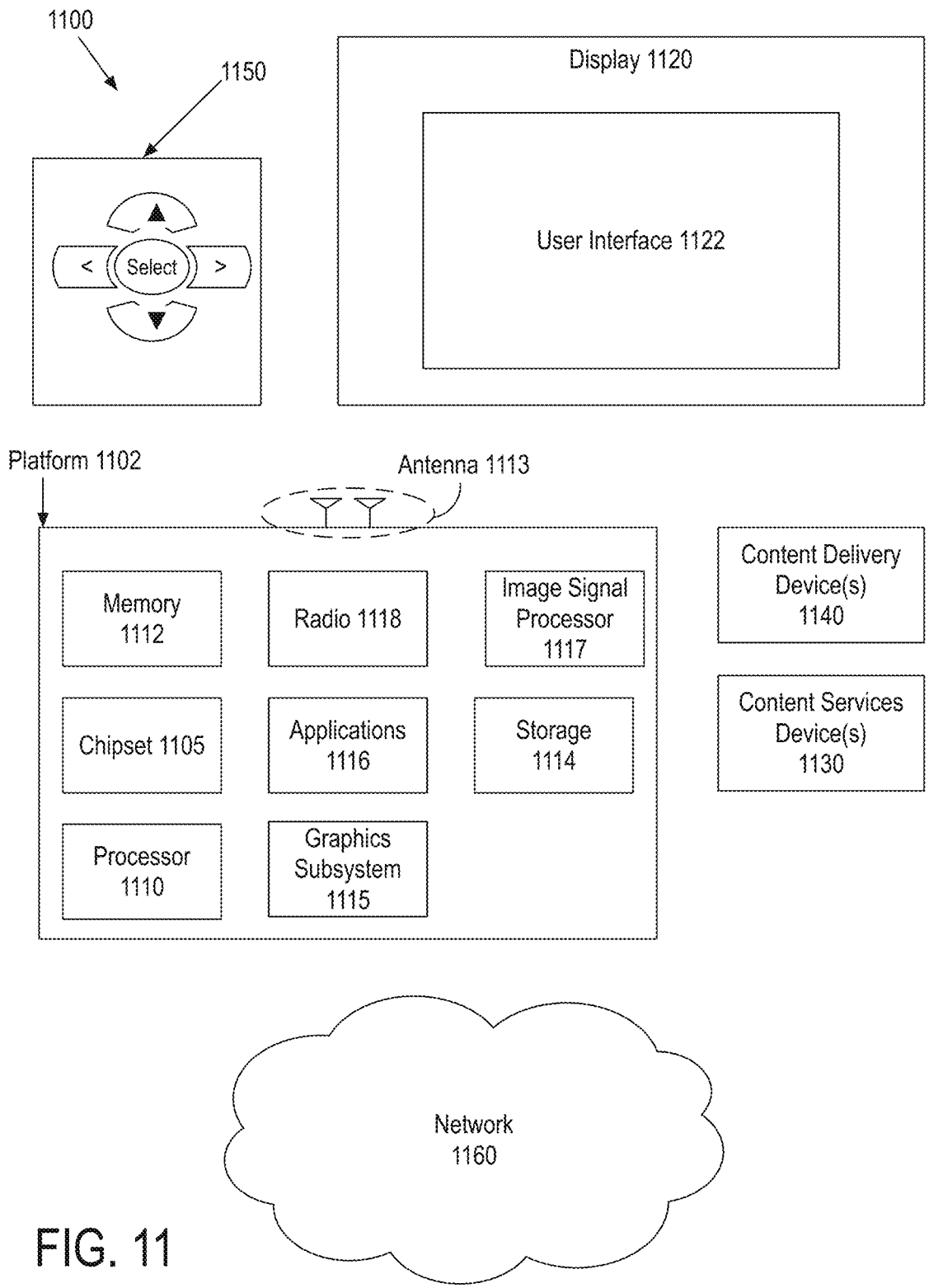
FIG. 11 is an illustrative diagram of an example system.

FIG. 11 is an illustrative diagram of an example system 1100, arranged in accordance with at least some implementations of the present disclosure. In various implementations, system 1100 may be a computing system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device (e.g., smart watch or smart glasses), mobile internet device (MID), messaging device, data communication device, peripheral device, scanner, printer, multi-function device, and so forth.

In various implementations, system 1100 includes a platform 1102 coupled to a display 1120. Platform 1102 may receive content from a content device such as content services device(s) 1130 or content delivery device(s) 1140. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116, image signal processor 1117 and/or radio 1118. Chipset 1105 may provide intercommunication among processor 1110, memory 1112, storage 1114, graphics subsystem 1115, applications 1116, image signal processor 1117 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Image signal processor 1117 may be implemented as a specialized digital signal processor or the like used for image processing. In some examples, image signal processor 1117 may be implemented based on a single instruction multiple data or multiple instruction multiple data architecture or the like. In some examples, image signal processor 1117 may be characterized as a media processor. As discussed herein, image signal processor 1117 may be implemented based on a system on a chip architecture and/or based on a multi-core architecture.

Graphics subsystem 1115 may perform processing of images such as still or video for display. Graphics subsystem 1115 may be a graphics processing unit (GPU), a visual processing unit (VPU), or an image processing unit, for example. In some examples, graphics subsystem 1115 may perform scanned image rendering as discussed herein. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or image processor and/or application specific integrated circuit may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any flat panel monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of navigation controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, navigation controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
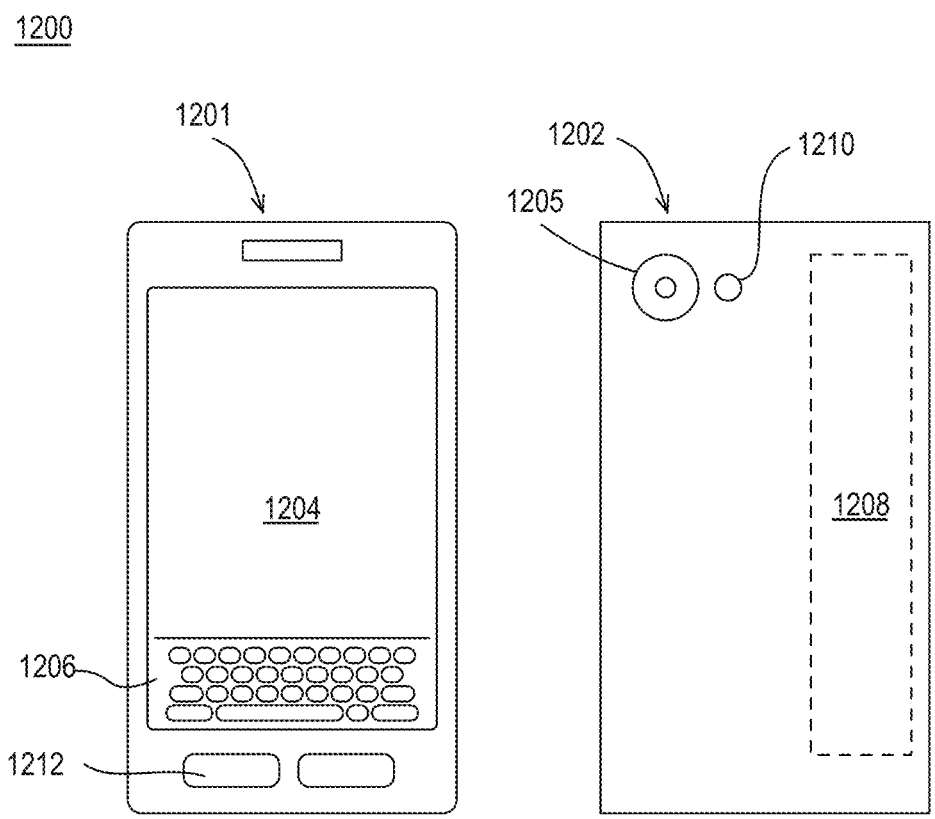
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, other devices or systems, or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor) and a flash 1210 integrated into back 1202 (or elsewhere) of device 1200. Camera 1205 and flash 1210 may be components of a camera module to originate image data processed into streaming video that is output to display 1204 and/or communicated remotely from device 1200 via antenna 1208 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system for image rectification comprising:
a memory configured to store one or more of a plurality of equirectangular images, wherein each of the equirectangular images corresponds to one of a plurality of neighboring fisheye images of a scene; and
one or more processors coupled to the memory, the one or more processors to:
attain feature point correspondences between the plurality of equirectangular images, wherein the feature point correspondences each comprise a feature point mapping between feature points of a neighboring pair of the equirectangular images;
determine multiple iterations of image warpings for the equirectangular images based on the feature point correspondences until an end condition is met, wherein the iterations comprise the one or more processors to:
determine first image warpings for each of the equirectangular images based on first pairings of neighboring ones of the equirectangular images, the first image warpings comprising a first image warping for a first equirectangular image based on a first feature point correspondence between the first equirectangular image and a second equirectangular image that neighbors the first equirectangular image in a first direction; and
determine second image warpings for each of the equirectangular images based on second pairings of neighboring ones of the equirectangular images, wherein each pairing in the first pairings is excluded from the second pairings, the second image warpings comprising a second image warping for the first equirectangular image based on a second feature correspondence between the first equirectangular image and a third equirectangular image that neighbors the first equirectangular image in a second direction;
warp each of the equirectangular images using image warpings corresponding to the end condition to generate rectified equirectangular images; and
transmit the rectified equirectangular images.

2. The system of claim 1, wherein the plurality of iterations of the multiple iterations each comprises the one or more processors to:
determine a measure of vertical difference between all feature point correspondences; and
set the end condition as met when the measure of vertical difference compares favorably to a threshold.

3. The system of claim 1, wherein the one or more processors to determine the first image warping comprises the one or more processors to:
generate feature point target positions for current feature points of the first equirectangular image in the first feature point correspondence, wherein a first feature point target position of the feature point target positions comprises a position of no change in a first dimension and a position between a first current feature point of the first equirectangular image and a corresponding first current feature point of the second equirectangular image in a second dimension; and
estimate a warping function for the first equirectangular image based on the current feature points and the feature point target positions to determine the first image warping.

4. The system of claim 3, wherein the first dimension comprises a horizontal dimension of the first equirectangular image, the second dimension comprises a vertical dimension of the first equirectangular image, and the position between the first current feature point of the first equirectangular image and the corresponding first current feature point of the second equirectangular image in the vertical dimension is substantially equidistant between the first current feature point of the first equirectangular image and the corresponding first current feature point of the second equirectangular image in the vertical dimension.

5. The system of claim 3, wherein the warping function comprises a cost minimization function to move the current feature points of the first equirectangular image toward the feature point target positions based on local differences between the current feature points and the feature point target positions and global distortion of the first equirectangular image.

6. The system of claim 3, wherein the warping function comprises a mesh warping function to move a mesh of vertices applied to the first equirectangular image from first to second positions, the one or more processors further to:
determine locations of the feature points using the first positions of the mesh of vertices;
generate the warping function with the second positions of the mesh of vertices as unknowns based on at least the locations of the feature points using the first positions of the mesh of vertices and the feature point target positions; and
determine the second positions of the mesh of vertices using the warping function.

7. The system of claim 6, wherein the warping function comprises a sum of a local alignment term and a global alignment term, wherein the local alignment term comprises a difference between the locations of the feature points using the first positions of the mesh of vertices and the feature point target positions, wherein the global alignment term comprises a difference between the second positions of the mesh of vertices and third positions of the mesh of vertices based on a warping of the first equirectangular image using homography, and wherein determining the second positions of the mesh of vertices using the warping function comprises minimizing the warping function.

8. The system of claim 7, wherein the global alignment term is zero for those second positions of the mesh of vertices within a neighborhood of any feature point of the feature points.

9. The system of claim 7, wherein the warping function further comprises a grid mesh similarity term to reduce grid warping based on the second positions of the mesh of vertices.

10. The system of claim 1, wherein the fisheye images are attained using cameras having fields of view of not less than 180 degrees.

11. A method for image rectification comprising:
attaining feature point correspondences between a plurality of equirectangular images, wherein each of the equirectangular images corresponds to one of a plurality of neighboring fisheye images of a scene, and wherein the feature point correspondences each comprise a feature point mapping between feature points of a neighboring pair of the equirectangular images;
determining multiple iterations of image warpings for the equirectangular images based on the feature point correspondences until an end condition is met, wherein the iterations comprise:
determining first image warpings for each of the equirectangular images based on first pairings of neighboring ones of the equirectangular images, the first image warpings comprising a first image warping for a first equirectangular image based on a first feature point correspondence between the first equirectangular image and a second equirectangular image that neighbors the first equirectangular image in a first direction; and
determining second image warpings for each of the equirectangular images based on second pairings of neighboring ones of the equirectangular images, wherein each pairing in the first pairings is excluded from the second pairings, the second image warpings comprising a second image warping for the first equirectangular image based on a second feature correspondence between the first equirectangular image and a third equirectangular image that neighbors the first equirectangular image in a second direction;
warping each of the equirectangular images using image warpings corresponding to the end condition to generate rectified equirectangular images; and
transmitting the rectified equirectangular images.

12. The method of claim 11, wherein the plurality of iterations of the multiple iterations each comprises:
determining a measure of vertical difference between all feature point correspondences; and
setting the end condition as met when the measure of vertical difference compares favorably to a threshold.

13. The method of claim 11, wherein determining the first image warping comprises:
generating feature point target positions for current feature points of the first equirectangular image in the first feature point correspondence, wherein a first feature point target position of the feature point target positions comprises a position of no change in a first dimension and a position between a first current feature point of the first equirectangular image and a corresponding first current feature point of the second equirectangular image in a second dimension; and
estimating a warping function for the first equirectangular image based on the current feature points and the feature point target positions to determine the first image warping.

14. The method of claim 13, wherein the warping function comprises a mesh warping function to move a mesh of vertices applied to the first equirectangular image from first to second positions, wherein determining the second positions comprises:
determining locations of the feature points using the first positions of the mesh of vertices;
generating the warping function with the second positions of the mesh of vertices as unknowns based on at least the locations of the feature points using the first positions of the mesh of vertices and the feature point target positions; and
determining the second positions of the mesh of vertices using the warping function.

15. The method of claim 14, wherein the warping function comprises a sum of a local alignment term and a global alignment term, wherein the local alignment term comprises a difference between the locations of the feature points using the first positions of the mesh of vertices and the feature point target positions, wherein the global alignment term comprises a difference between the second positions of the mesh of vertices and third positions of the mesh of vertices based on a warping of the first equirectangular image using homography, and wherein determining the second positions of the mesh of vertices using the warping function comprises minimizing the warping function.

16. At least one non-transitory machine readable medium comprising a plurality of instructions that, in response to being executed on a device, cause the device to perform image rectification by:
attaining feature point correspondences between a plurality of equirectangular images, wherein each of the equirectangular images corresponds to one of a plurality of neighboring fisheye images of a scene, and wherein the feature point correspondences each comprise a feature point mapping between feature points of a neighboring pair of the equirectangular images;

determining multiple iterations of image warpings for the equirectangular images based on the feature point correspondences until an end condition is met, wherein the iterations comprise:

determining first image warpings for each of the equirectangular images based on first pairings of neighboring ones of the equirectangular images, the first image warpings comprising a first image warping for a first equirectangular image based on a first feature point correspondence between the first equirectangular image and a second equirectangular image that neighbors the first equirectangular image in a first direction; and determining second image warpings for each of the equirectangular images based on second pairings of neighboring ones of the equirectangular images, wherein each pairing in the first pairings is excluded from the second pairings, the second image warpings comprising a second image warping for the first equirectangular image based on a second feature correspondence between the first equirectangular image and a third equirectangular image that neighbors the first equirectangular image in a second direction;

warping each of the equirectangular images using image warpings corresponding to the end condition to generate rectified equirectangular images; and transmitting the rectified equirectangular images.

17. The non-transitory machine readable medium of claim 16, wherein the plurality of iterations of the multiple iterations each comprises:

determining a measure of vertical difference between all feature point correspondences; and setting the end condition as met when the measure of vertical difference compares favorably to a threshold.

18. The non-transitory machine readable medium of claim 16, wherein determining the first image warping comprises:

generating feature point target positions for current feature points of the first equirectangular image in the first feature point correspondence, wherein a first feature point target position of the feature point target positions comprises a position of no change in a first dimension and a position between a first current feature point of the first equirectangular image and a corresponding first current feature point of the second equirectangular image in a second dimension; and estimating a warping function for the first equirectangular image based on the current feature points and the feature point target positions to determine the first image warping.

19. The non-transitory machine readable medium of claim 18, wherein the warping function comprises a mesh warping function to move a mesh of vertices applied to the first equirectangular image from first to second positions, wherein determining the second positions comprises:

determining locations of the feature points using the first positions of the mesh of vertices;

generating the warping function with the second positions of the mesh of vertices as unknowns based on at least the locations of the feature points using the first positions of the mesh of vertices and the feature point target positions; and determining the second positions of the mesh of vertices using the warping function.

20. The non-transitory machine readable medium of claim 19, wherein the warping function comprises a sum of a local alignment term and a global alignment term, wherein the local alignment term comprises a difference between the locations of the feature points using the first positions of the mesh of vertices and the feature point target positions, wherein the global alignment term comprises a difference between the second positions of the mesh of vertices and third positions of the mesh of vertices based on a warping of the first equirectangular image using homography, and wherein determining the second positions of the mesh of vertices using the warping function comprises minimizing the warping function.

21. The non-transitory machine readable medium of claim 20, wherein the global alignment term is zero for those second positions of the mesh of vertices within a neighborhood of any feature point of the feature points.

* * * * *